United States Patent Office 3,559,436
Patented Feb. 2, 1971

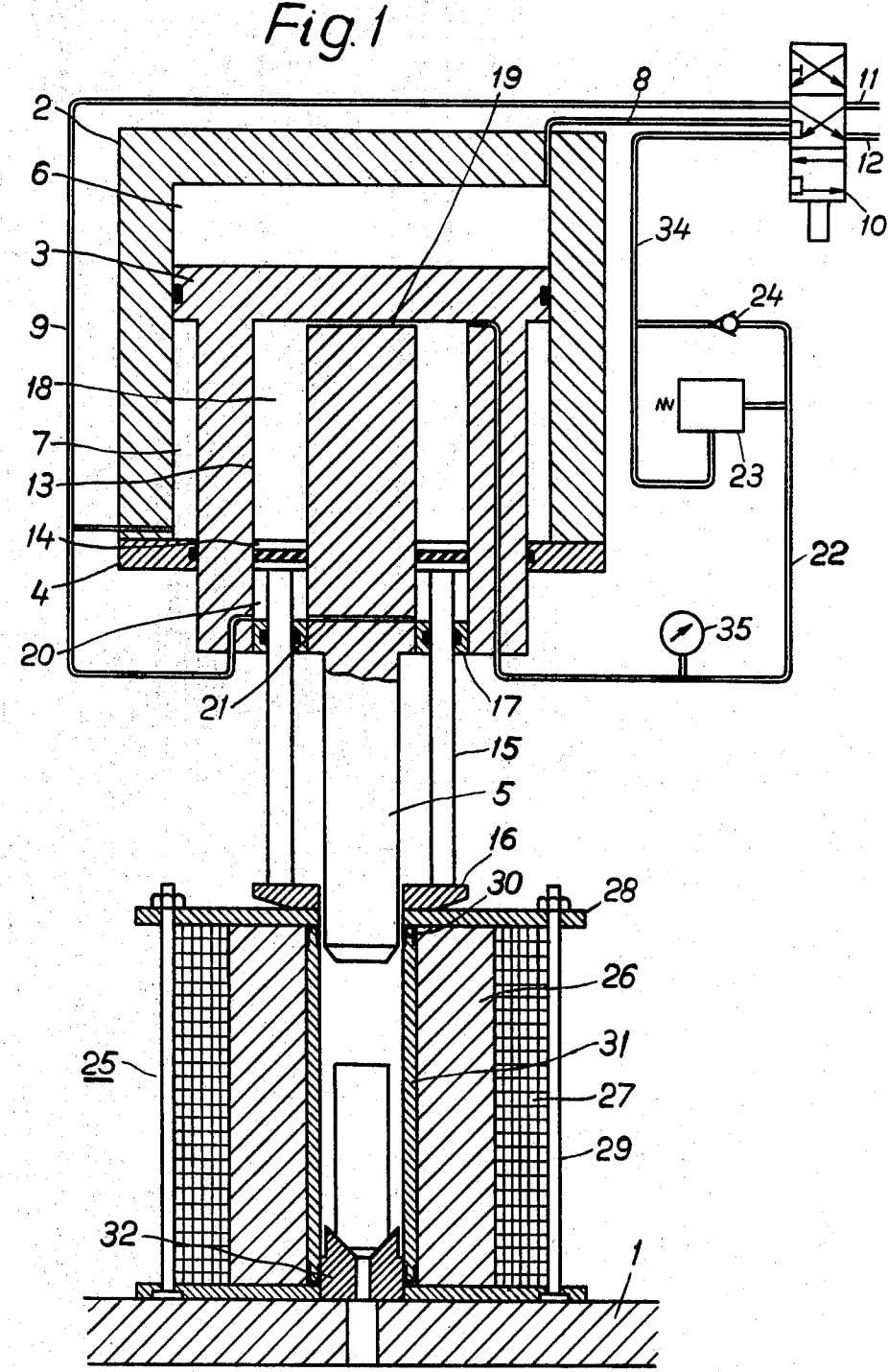

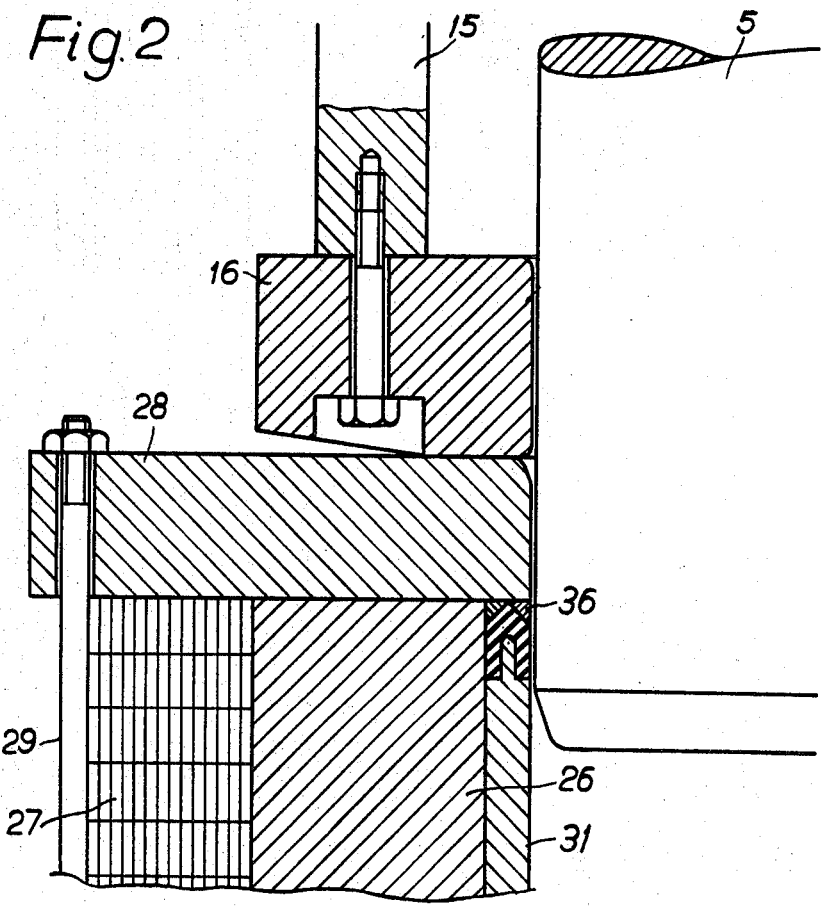
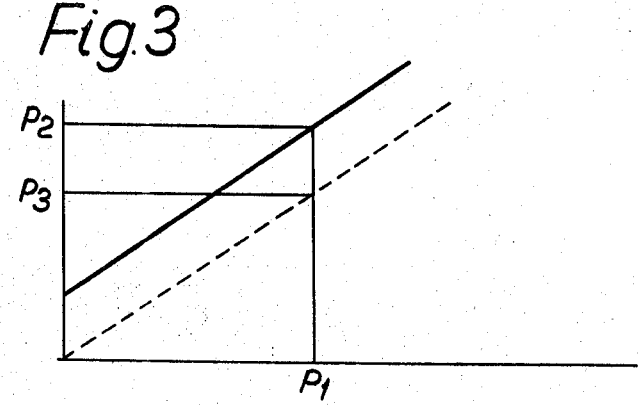

3,559,436
PRESS FOR HYDROSTATIC EXTRUSION
Jan Nilsson, Robertsfors, Sweden, assignor to Allmanna
Svenska Elektriska Aktiebolaget, Vasteras, Sweden
Filed Oct. 28, 1968, Ser. No. 771,196
Claims priority, application Sweden, Nov. 1, 1967,
14,953/67
Int. Cl. B21c 23/08
U.S. Cl. 72—60      8 Claims

ABSTRACT OF THE DISCLOSURE

A hydraulic press has a main operating cylinder with an operating piston slidable therein and an extrusion cylinder with a die at one end and an extruding piston rigid with the operating piston entering the other end. The extrusion cylinder has a sheath wound around it, end pieces enclosing the sheath and seals between the end pieces and the ends of the extrusion cylinder. A ring engaging the upper end piece is pressed downward against it by auxiliary pistons slidable in cylinders formed in the operating piston to compress the seals between the end pieces and the ends of the cylinder.

BACKGROUND OF THE INVENTION

(1) Field of the invention

The present invention relates to a press for hydrostatic extrusion comprising a press stand with a press table and a main operating cylinder held together by connecting rods or a strip sheath, a pressure-generating piston operated by a piston in said operating cylinder, and a pressure chamber formed by a high pressure cylinder, a die arranged in the high pressure cylinder and the pressure generating piston projecting into the cylinder.

(2) The prior art

With the extremely high pressure required for hydrostatic extrusion, usually between 10 and 30 kbar, the stresses in the high pressure cylinder will be very considerable so that it normally consists of an inner steel cylinder surrounded by a strip sheath and provided with end pieces held together by bolts outside the strip sheath. The end pieces often also provide support for seals between the cylinder and pressure-generating piston and die. Since the stresses in the cylinder are extremely high it is important that the cylinder is completely smooth inside and that seals are positioned as near the ends of the cylinder as possible to ensure that the variations in tension are as small as possible.

The seals are usually fixed axially in relation to the cylinder by the end pieces and a spacer casing inserted in the cylinder. Triangular metal rings are usually inserted in the corners between the cylinder and the end pieces and between the end pieces and die or pressure-generating piston, respectively.

The end pieces are held together by bolts which are normally placed completely outside the sheath of the cylinder to achieve the greatest possible strength.

At the high pressure used for hydrostatic extrusion seals are pressed out even into small gaps. It is therefore important that the pressure on the seals around the piston and die in the pressure chamber does not give rise to a gap between the cylinder and the end pieces. The bolts holding the end pieces together are therefore prestressed so that the contact pressure against the cylinder exceeds the maximum axial force which the liquid in the pressure chamber can exert on the seal. This has meant that the friction between the end of the cylinder and the end pieces is great when the diameter of the cylinder has increased or decreased due to pressure alterations. Surface damage has often occurred giving dangerous indications of rupture.

SUMMARY OF THE INVENTION

According to the invention the above disadvantages are avoided by providing the press with at least one auxiliary cylinder with a piston member influencing a load holder arranged at the end of the pressure cylinder, with a force dependent on the pressure in the pressure chamber. The auxiliary cylinder or cylinders are arranged with advantage inside the piston of the main operating cylinder. An annular piston may be used. The force can be made dependent on the pressure in the pressure chamber by allowing the auxiliary cylinders to communicate with the main cylinder. In one embodiment the cylinders communicate with each other by means of an external conduit and valve system which gives no or negligible pressure losses when pressure medium flows to the auxiliary cylinders and gives a constant or adjustable pressure loss when pressure medium flows from the auxiliary cylinders. In another embodiment the main operating cylinder and auxiliary cylinders communicate by means of a conduit and valve system of the same type arranged inside the piston of the main operating cylinder.

The invention means that the end pieces do not need to transmit the force operating on the seals to the bolts at the outer periphery of the cylinder and are thus not subjected to bending stresses. Thus, they need only be designed so that they protect the end surfaces and hold together a strip sheath which may be provided. Neither do the end pieces need to be prestressed with a force corresponding to the sealing force to prevent a gap appearing between the end surface of the cylinder and the end pieces themselves. The contact pressure against the cylinder can thus be kept so low that sliding is possible between cylinder, end surface and end pieces without the sliding surfaces being damaged. Since the load holder is constantly influenced by a force suited to the pressure in the high pressure chamber, all risk is removed that the force influencing the seals around the piston and die will cause the end pieces to yield so that a gap is formed between the end surfaces of the cylinder and the end pieces into which the seal is pressed and damaged so that its life is shortened.

BRIEF DESCRIPTION OF THE DRAWINGS

With the help of the accompanying drawings an embodiment of the means according to the invention is shown and described. FIG. 1 shows, with the exception of the press stand itself, the essential parts in a press for hydrostatic extrusion and FIG. 2 shows a detail of the upper part of the high pressure cylinder of the press and the part of the load holder which is in contact with the cylinder. FIG. 3 shows a relationship between holder pressure and the force operating on the seal. The pressure in the high pressure cylinder has been indicated along the abscissa and the force on the seal and the opposite force on the load holder along the ordinate. At the cylinder pressure $P_1$, the holding force is $P_2$ and the force operating on the seal $P_3$.

DESCRIPTION OF THE PREFERRED EMBODIMENTS

In the drawings 1 designates a press table and 2 a main operating pressure cylinder in a press, the stand otherwise not being shown. In the cylinder runs an operating piston 3, of differential type, passing through a lid 4 and supporting at its free end a pressure-generating extruding piston 5. The spaces 6 and 7 on both sides of the piston are, by means of the conduits 8 and 9, respectively, in communication with a valve 10 which in turn through the conduits 11 and 12, respectively, is in communication with a pressure medium source and pressure medium container, respectively, not shown in the drawings. In the piston 3 is a number of auxiliary cylinders 13 in which run auxiliary pistons 14 of differential type. These are joined to a ring 16 by means of piston rods 15. The piston rods 15 pass through the lid 17 in the piston 3. The spaces 18 above the pistons 14 are connected to each other by means of channels 19. The spaces 20 below the pistons 14 are connected to each other by channels 21. The spaces 18, through the conduit 22, control valve 23, the nonreturn valve 24 parallel to this, and the conduit 34, are in connection with the valve 10, and, in the central and upper positions of the valve 10, also through this in communication with the space 6.

The high pressure cylinder 25 shown here consists of an internally and externally smooth cylinder 26 surrounded by a prestressed strip sheath 27 and two end pieces 28 which are held together by a number of bolts 29. Inside the cylinder 26 and in the immediate vicinity of its end surfaces are arranged high pressure seals 30 which are fixed in their correct positions by a spacer casing 31 and the end pieces used as a holder. 36 indicates metal rings having a triangular cross section against which the seals 30 abut. Normally the holders consist of rings attached in the end pieces which can easily be removed to exchange the seals. A die 32 and a billet 33 are inserted in the cylinder 25. 35 is a pressure gauge with built-in contact member, connected to the conduit 22.

The press operates in the following manner: At the start of an operating cycle the pistons 3 and 4 are in their upper positions and the valve 10 in its lower position. Pressure medium is supplied to the spaces 18 in the cylinders 13 from a pressure medium source, not shown, through the conduit 11, valve 10, conduit 34, valve 24 and conduit 22 so that pistons 14 are pressed downwards until the ring 16 makes contact with the end piece 28 or a ring inserted in this end piece which holds the seal 30. During this movement pressure, medium in the spaces 20 is pressed out of the space through the conduit 9, valve 10 and conduit 12 to a container, not shown. When the force against the load holder, and thus the pressure in the spaces 18 and conduit 22, has reached a certain predetermined value, the contact member in the pressure gauge 35 sends an impulse to the operating device of the valve 10 so that the central position shown in FIG. 1 is obtained. In this valve position both the conduits 8 and 34 are in communication with the pressure medium source through the valve 10 and conduit 11. The space 6 is supplied with pressure medium which endeavours to drive the piston 3 downwards. The volume in the spaces 18 is thus decreased. Since these spaces are now in communication with the space 6 through the conduit 22, overflow valve 23, conduit 34, valve 10 and conduit, a pressure difference is obtained which is dependent on the adjustment of the valve 23. If the sum of the piston surfaces 14 is equal to the surface of the sealing 30 subjected to the pressure in the cylinder 25, the holder force for every pressure in the cylinder 25 exceeds the force operating on the seal by the same value $P_2-P_3$, as is clear from FIG. 3. This value, however, is dependent on the adjustment of the valve 23. If the sum of the piston surfaces 14 is chosen greater than the surface of the seal 30, the holder force exceeds the force operating on the seal by a value increasing with the pressure in the cylinder 25.

When extrusion is completed the valve 10 is moved to its upper position. The spaces 7 and 20 are now placed in communication with the pressure medium source through the valve 10 and the spaces 6 and 18 with the oil container so that the pistons 3 and 14 will be returned to their upper positions. When this has taken place a complete operating cycle has been performed.

The invention is not limited to the embodiments shown. Several variations and modifications are feasible within the scope of the following claims.

I claim:

1. Press for hydrostatic extrusion comprising a press stand having a table, a main operating cylinder, an operating piston movable therein, a high pressure cylinder carried by the table and aligned with said main cylinder, an extruding piston movable in an end of said high pressure cylinder connected to said operating piston, a die in the other end of said high pressure cylinder, end pieces at the ends of the high pressure cylinder, seals at each end of the high pressure cylinder positioned between the end pieces and the ends of the high pressure cylinder, auxiliary cylinder and piston means for exerting a pressure on the end pieces remote from the table to balance the pressure in the high pressure cylinder acting upon the seals between the end pieces and the ends of the high pressure cylinder, and means to supply a fluid to said auxiliary cylinder and piston means having a pressure dependent on the pressure in said main operating cylinder.

2. Press as claimed in claim 1, in which the auxiliary means includes at least one auxiliary cylinder within the body of the operating piston and an auxiliary piston slidable in said auxiliary cylinder, 3. Press as claimed in claim 2, in which the auxiliary piston is annular.

4. Press as claimed in claim 2, having means connecting the operating cylinder and the auxiliary cylinder.

5. Press as claimed in claim 2, in which the main and auxiliary cylinders communicate with each other by a conduit and valve system which gives negligible pressure losses when pressure medium flows to the auxiliary cylinder and gives an adjustable pressure loss when pressure medium flows from the auxiliary cylinder.

6. Press as claimed in claim 5, in which the conduit and valve system between the main operating cylinder and the auxiliary cylinder is arranged inside the operating piston.

7. Press as claimed in claim 1, in which the auxiliary means includes at least one auxiliary cylinder, and the main and auxiliary cylinders communicate with each other by a conduit and valve system which gives negligible pressure losses when pressure medium flows to the auxiliary cylinder and gives an adjustable pressure loss when pressure medium flows from the auxiliary cylinder.

8. Press as claimed in claim 7 in which the conduit and valve system between the main operating cylinder and the auxiliary cylinder is arranged inside the operating piston.

References Cited

UNITED STATES PATENTS

| 3,379,043 | 4/1968 | Fuchs, Jr. | 72—60 |
| 3,390,563 | 7/1968 | Fuchs, Jr. | 72—60 |
| 3,467,273 | 9/1969 | Campbell et al. | 72—60 |

FOREIGN PATENTS

| 1,497,362 | 8/1967 | France | 72—60 |

RICHARD J. HERBST, Primary Examiner

U.S. Cl. X.R.

72—272, 710